United States Patent [19]
Panwar et al.

[11] Patent Number: 5,875,316
[45] Date of Patent: Feb. 23, 1999

[54] METHOD FOR HANDLING COMPLEX INSTRUCTIONS IN AN OUT-OF-ORDER PROCESSOR

[75] Inventors: Ramesh Panwar, Santa Clara; Dani Y. Dakhil, Los Altos, both of Calif.

[73] Assignee: Sun Microsystems, Inc., Palo Alto, Calif.

[21] Appl. No.: 881,846

[22] Filed: Jun. 25, 1997

[51] Int. Cl.⁶ ..................... G06F 9/30
[52] U.S. Cl. ..................... 395/391
[58] Field of Search ............. 399/391, 390, 399/384, 388

[56] References Cited

U.S. PATENT DOCUMENTS

| | | | |
|---|---|---|---|
| 5,134,561 | 7/1992 | Liptay. | |
| 5,218,712 | 6/1993 | Cutler et al. | 395/570 |
| 5,222,244 | 6/1993 | Cardine et al. | 395/385 |
| 5,487,156 | 1/1996 | Popescu et al. . | |
| 5,546,597 | 8/1996 | Martell et al. . | |
| 5,553,256 | 9/1996 | Fetterman et al. | 395/393 |
| 5,560,032 | 9/1996 | Nguyen et al. . | |
| 5,561,776 | 10/1996 | Popescu et al. . | |
| 5,574,927 | 11/1996 | Scantlin | 395/376 |
| 5,625,837 | 4/1997 | Popescu et al. . | |
| 5,781,753 | 8/1998 | McFarland et al. | 395/394 |
| 5,796,973 | 9/1998 | Witt et al. | 3695/384 |

*Primary Examiner*—William M. Treat
*Attorney, Agent, or Firm*—James A. Pinto; William J. Kubida; Holland & Hart LLP

[57] ABSTRACT

In a processor that executes complex instructions which are expanded into microinstructions prior to execution, non-complex instruction execution is optimized by providing a by-passable helper logic for expanding complex instructions into microinstructions. Control logic parses a bundle of instructions into sub-bundles of non-complex instructions and sub-bundles of microinstructions. The control logic detects when a complex instruction is present in a bundle of instructions and directs the complex instruction to the helper logic for expansion into two or more microinstructions. Each non-complex instruction bypasses the helper logic, thereby improving the execution performance of the non-complex instruction.

7 Claims, 9 Drawing Sheets

METHOD FOR HANDLING COMPLEX INSTRUCTIONS IN AN OUT-OF-ORDER PROCESSOR

CROSS-REFERENCES TO RELATED APPLICATIONS

The subject matter of the present application is related to that of co-pending U.S. Pat. application Ser. No. 08/881,958 identified as AN APPARATUS FOR HANDLING ALIASED FLOATING-POINT REGISTERS IN AN OUT-OF-ORDER PROCESSOR filed concurrently herewith by Ramesh Panwar; Ser. No. 08/881,729 identified as APPARATUS FOR PRECISE ARCHITECTURAL UPDATE IN AN OUT-OF-ORDER PROCESSOR filed concurrently herewith by Ramesh Panwar and Arjun Prabhu; Ser. No. 08/881,726 identified as AN APPARATUS FOR NON-INTRUSIVE CACHE FILLS AND HANDLING OF LOAD MISSES filed concurrently herewith by Ramesh Panwar and Ricky C. Hetherington; Ser. No. 08/881,908 identified as AN APPARATUS FOR HANDLING COMPLEX INSTRUCTIONS IN AN OUT-OF-ORDER PROCESSOR filed concurrently herewith by Ramesh Panwar and Dani Y. Dakhil; Ser. No. 08/882,173 identified as for AN APPARATUS FOR ENFORCING TRUE DEPENDENCIES IN AN OUT-OF-ORDER PROCESSOR filed concurrently herewith by Ramesh Panwar and Dani Y. Dakhil; Ser. No. 08/881,145 identified as for APPARATUS FOR DYNAMICALLY RECONFIGURING A PROCESSOR filed concurrently herewith by Ramesh Panwar and Ricky C. Hetherington; Ser. No. 08/881,732 identified as APPARATUS FOR ENSURING FAIRNESS OF SHARED EXECUTION RESOURCES AMONGST MULTIPLE PROCESSES EXECUTING ON A SINGLE PROCESSOR filed concurrently herewith by Ramesh Panwar and Joseph I. Chamdani; Ser. No. 08/882,175 identified as for SYSTEM FOR EFFICIENT IMPLEMENTATION OF MULTI-PORTED LOGIC FIFO STRUCTURES IN A PROCESSOR filed concurrently herewith by Ramesh Panwar; Ser. No. 08/882,311 identified as for AN APPARATUS FOR MAINTAINING PROGRAM CORRECTNESS WHILE ALLOWING LOADS TO BE BOOSTED PAST STORES IN AN OUT-OF-ORDER MACHINE filed concurrently herewith by Ramesh Panwar, P. K. Chidambaran and Ricky C. Hetherington; Ser. No. 08/881,731 identified as for APPARATUS FOR TRACKING PIPELINE RESOURCES IN A SUPERSCALAR PROCESSOR filed concurrently herewith by Ramesh Panwar; Ser. No. 08/882,525 identified as for-AN APPARATUS FOR RESTRAINING OVER-EAGER LOAD BOOSTING IN AN OUT-OF-ORDER MACHINE filed concurrently herewith by Ramesh Panwar and Ricky C. Hetherington; Ser. No. 08/882,220 identified as AN APPARATUS FOR HANDLING REGISTER WINDOWS IN AN OUT-OF-ORDER PROCESSOR filed concurrently herewith by Ramesh Panwar and Dani Y. Dakhil; Ser. No. 08/881,847 identified as AN APPARATUS FOR DELIVERING PRECISE TRAPS AND INTERRUPTS IN AN OUT-OF-ORDER PROCESSOR filed concurrently herewith by Ramesh Panwar; Ser. No. 08/881,728 identified as NON-BLOCKING HIERARCHICAL CACHE THROTTLE filed concurrently herewith by Ricky C. Hetherington and Thomas M. Wicki; Ser. No. 08/881,727 identified as NON-THRASHABLE NON-BLOCKING HIERARCHICAL CACHE filed concurrently herewith by Ricky C. Hetherington, Sharad Mehrotra and Ramesh Panwar; Ser. No. 08/881,065 identified as IN-LINE BANK CONFLICT DETECTION AND RESOLUTION IN A MULTI-PORTED NON-BLOCKING CACHE filed concurrently herewith by Ricky C. Hetherington, Sharad Mehrotra and Ramesh Panwar; and Ser. No. 08/882,613 identified as SYSTEM FOR THERMAL OVERLOAD DETECTION AND PREVENTION FOR AN INTEGRATED CIRCUIT PROCESSOR filed concurrently herewith by Ricky C. Hetherington and Ramesh Panwar, the disclosures of which applications are herein incorporated by this reference.

BACKGROUND OF THE INVENTION

1. Field of the Invention

This invention relates in general to microprocessors, and more particularly, to microprocessor architectures and methods for processing complex or non-RISC instructions within the processor.

2. Relevant Background

In order to improve the overall performance of a computer processor (also called a microprocessor), modern processor architectures are designed to optimally execute a particular subset or "core" set of the entire instruction set supported by the processor. The processor hardware architectures are designed such that the core instructions can be efficiently executed within the processor utilizing a minimum, limited, or optimum number of resource in the processor. These instructions therefore are processed in the most efficient manner within the processor, generally within a minimum number of clock cycles.

Non-core instructions are referred to as a "complex" instruction in that executing the instruction requires more of the processor's resources than do the core instructions. To execute a complex instruction, conventional processor designs expand a complex instruction into two or more micro instructions comprised of core instructions. The processor can process the microinstructions in an efficient manner. However, since the complex instruction is broken into multiple microinstructions, the execution time of the complex instruction is penalized. Examples of these complex instructions include the CAS (compare and swap) instruction and LDD (load double) instruction which are part of the Scaleable Processor Architecture (SPARC) instruction set.

Complex instructions present a challenge for high frequency execution (i.e., a 250 MHz or more clock frequency) in a processor because these instructions place greater demands on the execution resources of the processor than do other core instructions. In particular, in a processor utilizing a "wide-issue" of instructions, wherein the processor fetches a plurality of instructions (known as a fetch bundle) from the instruction cache at one time for placement in one or more instruction pipelines, the handling of complex instructions is problematic. Any instruction in the fetch bundle may be a complex instruction that may need to be expanded into simpler microinstructions. If, for instance, the fetch bundle contains eight complex instructions each expandable into eight microinstructions, then there will be sixty-four microinstructions created for processing. During such expansion, it is desirable to maintain the order in which the instructions were originally programmed.

Furthermore, conventional processor hardware architecture designs generally exact a processing penalty on all instructions, either complex or non-complex, in that each instruction is passed through an expansion stage for creating microinstructions. Typically, these conventional implementations have decode pipeline stages in which the complex instructions are decoded into simpler microinstructions What is needed is a mechanism for handling complex instructions in a wide-issue processor which reduces the processing penalty exacted upon core or simple instructions and maintains the order in which instructions are to be executed.

SUMMARY OF THE INVENTION

The above problems have been solved by the apparatus of the present invention for processing complex and non-complex instructions without penalizing the processing of non-complex instructions. The present invention devotes an extra by-passable pipeline stage for generating and queuing the microinstructions of a complex instruction.

The instruction cache marks each instruction with a marker bit in a main instruction bundle of up to 8 instructions, the markers identifying complex instructions. The control logic scans the main bundle for the presence of any instructions marked as complex. The control logic then breaks up the main bundle into multiple sub-bundles of instructions if the main bundle contains any instruction that is marked as a complex. The control logic allows all non-complex instructions up to the first complex instruction to by-pass the helper logic and pass directly through to the next stage of instruction processing. In this way, complex instructions can be processed and expanded into microinstructions without penalizing the non-complex instructions since the non-complex instructions simply bypass this extra pipeline stage.

For complex instructions, the helper logic explodes a complex instruction into its constituent microinstructions to form a complex sub-bundle before continuing to scan the main bundle for additional non-complex instructions. Any non-complex instructions that precede any other complex instruction will be sent in the next sub-bundle down the pipeline before exploding the next complex instruction in the main bundle. In a particular example, the helper logic serially processes the main bundle detecting the complex instructions and breaking up the main bundle into smaller sub-bundles for passing down the pipeline.

In a method implementation of the invention, a method for processing complex and non-complex instructions is also disclosed. A grouping step groups instructions into a bundle of instructions. An analyzing step checks an instruction in the bundle to detect a complex instruction. Non-complex instructions are placed into a first sub-bundle until a complex instruction is detected. Upon detecting a complex instruction, an issuing step schedules or issues the first sub-bundle for execution, and an expanding step expands the complex instruction into two or more microinstructions in a second sub-bundle. An issuing step then schedules or issues the second sub-bundle for execution, and the process is repeated on each instruction in the bundle.

In this manner, the core non-complex instructions are not overly burdened by the presence of multiple complex instructions in a wide-issue processor.

The foregoing and other features, utilities and advantages of the invention will be apparent from the following more particular description of a preferred embodiment of the invention as illustrated in the accompanying drawings.

DETAILED DESCRIPTION OF THE PREFERRED EMBODIMENTS

The present invention recognizes that complex instructions occur relatively infrequently during the program execution and can be penalized during instruction fetching without significantly impacting the overall performance of the processor. In accordance with the present invention, these complex instructions are passed through a logic stage hereinafter referred to as "helper" logic, which expands a complex instruction into multiple microinstructions which are simpler instructions each individually utilizing fewer resources of the processor. The helper logic is by-passable so that non-complex instructions are not penalized by any latency associated with helper logic processing functions. Control logic, which manages the flow path taken by an instruction, further breaks up an incoming main bundle of instructions (containing up to eight instruction) into sub-bundles for simplified instruction processing. The sub-bundles will contain either non-complex instructions, or microinstructions corresponding to a complex instruction. Both the helper logic and control logic are described in greater detail below, particularly with respect to FIG. 3–8.

Figure 1:
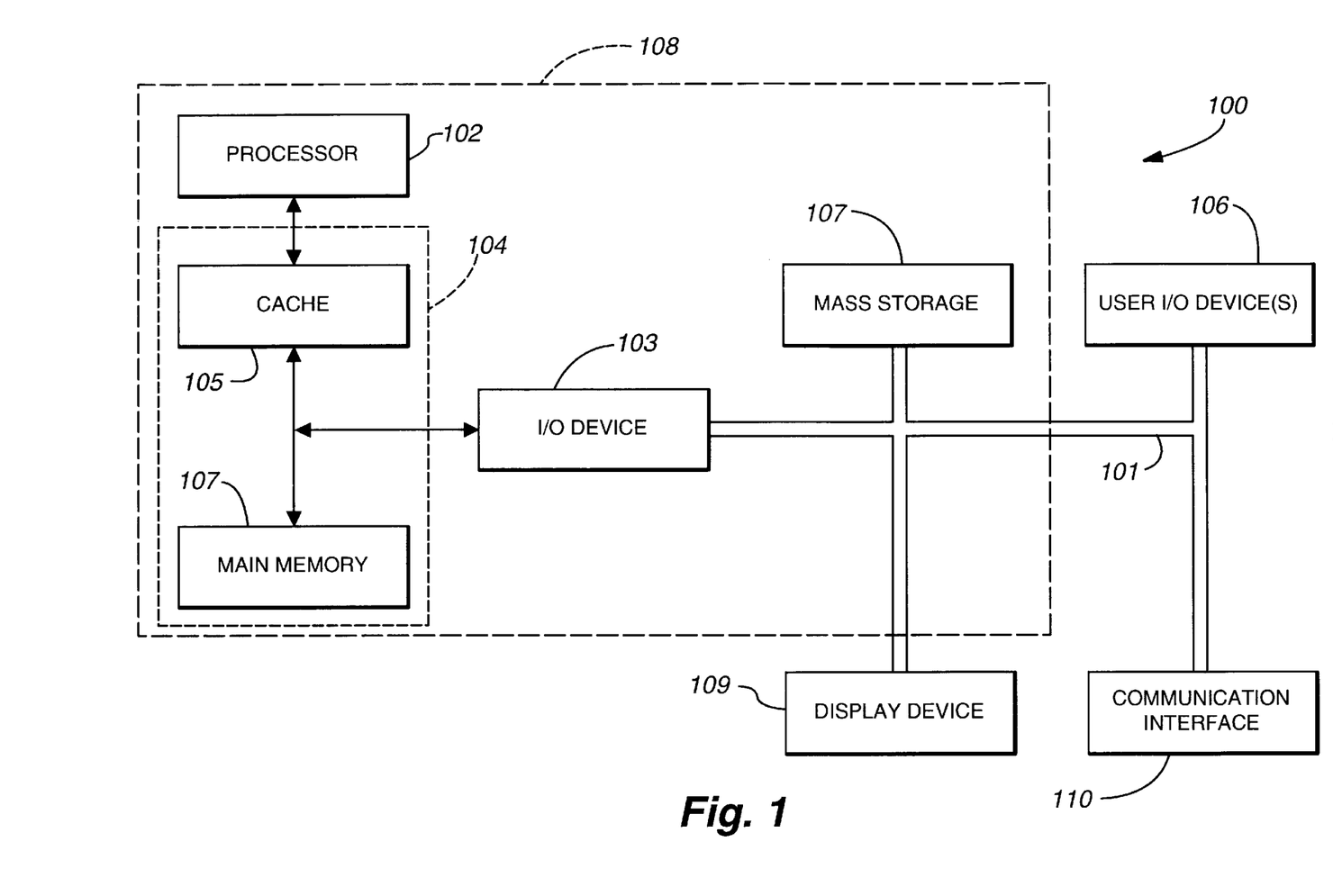
FIG. 1 shows in block diagram form a computer system in accordance with the present invention.

Processor architectures can be represented as a collection of interacting functional units as shown in FIG. 1. These functional units, discussed in greater detail below, perform the functions of fetching instructions and data from memory, preprocessing fetched instructions, scheduling instructions to be executed, executing the instructions, managing memory transactions, and interfacing with external circuitry and devices.

Figure 2:
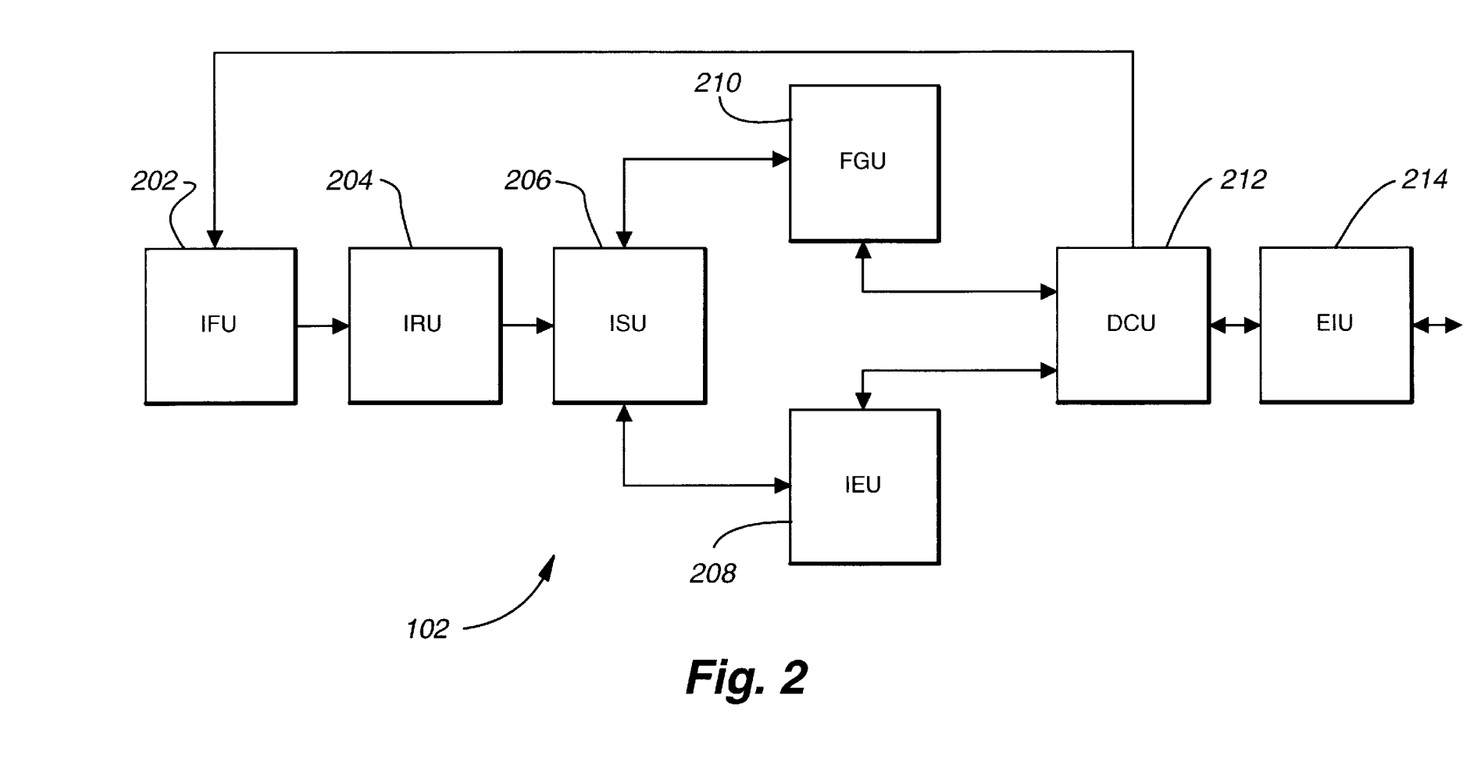
FIG. 2 shows a processor in block diagram form in accordance with the present invention.

The present invention is described in terms of apparatus and methods particularly useful in a superpipelined and superscalar processor 102 shown in block diagram form in FIG. 1 and FIG. 2. The particular examples represent implementations useful in high clock frequency operation and processors that issue and executing multiple instructions per cycle (IPC). However, it is expressly understood that the inventive features of the present invention may be usefully embodied in a number of alternative processor architectures that will benefit from the performance features of the present invention. Accordingly, these alternative embodiments are equivalent to the particular embodiments shown and described herein.

FIG. 1 shows a typical general purpose computer system 100 incorporating a processor 102 in accordance with the present invention. Computer system 100 in accordance with the present invention comprises an address/data bus 101 for communicating information, processor 102 coupled with bus 101 through input/output (I/O) device 103 for processing data and executing instructions, and memory system 104 coupled with bus 101 for storing information and instructions for processor 102. Memory system 104 comprises, for example, cache memory 105 and main memory 107. Cache memory 105 includes one or more levels of cache memory. In a typical embodiment, processor 102, I/O device 103, and some or all of cache memory 105 may be integrated in a single integrated circuit, although the specific components and integration density are a matter of design choice selected to meet the needs of a particular application.

User I/O devices 106 are coupled to bus 101 and are operative to communicate information in appropriately structured form to and from the other parts of computer 100. User I/O devices may include a keyboard, mouse, card reader, magnetic or paper tape, magnetic disk, optical disk, or other available input devices, include another computer. Mass storage device 117 is coupled to bus 101 may be implemented using one or more magnetic hard disks, magnetic tapes, CDROMs, large banks of random access memory, or the like. A wide variety of random access and read only memory technologies are available and are equivalent for purposes of the present invention. Mass storage 117 may include computer programs and data stored therein. Some or all of mass storage 117 may be configured to be incorporated as a part of memory system 104.

In a typical computer system 100, processor 102, I/O device 103, memory system 104, and mass storage device 117, are coupled to bus 101 formed on a printed circuit board and integrated into a single housing as suggested by the dashed-line box 108. However, the particular components chosen to be integrated into a single housing is based upon market and design choices. Accordingly, it is expressly understood that fewer or more devices may be incorporated within the housing suggested by dashed line 108.

Display device 109 is used to display messages, data, a graphical or command line user interface, or other communications with the user. Display device 109 may be implemented, for example, by a cathode ray tube (CRT) monitor, liquid crystal display (LCD) or any available equivalent.

FIG. 2 illustrates principle components of processor 102 in greater detail in block diagram form. It is contemplated that processor 102 may be implemented with more or fewer functional components and still benefit from the apparatus and methods of the present invention unless expressly specified herein. Also, functional units are identified using a precise nomenclature for ease of description and understanding, but other nomenclature often is often used to identify equivalent functional units.

Instruction fetch unit (IFU) 202 comprises instruction fetch mechanisms and includes, among other things, an instruction cache for storing instructions, branch prediction logic, and address logic for addressing selected instructions in the instruction cache. The instruction cache is commonly referred to as a portion (I$) of the level one (L1) cache with another portion (D$) of the L1 cache dedicated to data storage. IFU 202 fetches one or more instructions at a time by appropriately addressing the instruction cache. The instruction cache feeds addressed instructions to instruction rename unit (IRU) 204. Preferably, IFU 202 fetches multiple instructions each cycle and in a specific example fetches eight instructions each cycle—known as an instruction bundle or main bundle. Any number of instructions may be included in a bundle to meet the needs and limitations of a particular application.

In the absence of conditional branch instruction, IFU 202 addresses the instruction cache sequentially. The branch prediction logic in IFU 202 handles branch instructions, including unconditional branches. An outcome tree of each branch instruction is formed using any of a variety of available branch prediction algorithms and mechanisms. More than one branch can be predicted simultaneously by supplying sufficient branch prediction resources. After the branches are predicted, the address of the predicted branch is applied to the instruction cache rather than the next sequential address.

IRU 204 comprises one or more pipeline stages that include instruction renaming and dependency checking mechanisms. The instruction renaming mechanism is operative to map register specifiers in the instructions to physical register locations and to perform register renaming to prevent dependencies. IRU 204 further comprises dependency checking mechanisms that analyze the instructions to determine if the operands (identified by the instructions' register specifiers) cannot be determined until another "live instruction" has completed. The term "live instruction" as used herein refers to any instruction that has been fetched from the instruction cache but has not yet completed or been retired. IRU 204 outputs renamed instructions to instruction scheduling unit (ISU) 206.

As discussed above, program code may contain complex instructions, (also known as "macroinstructions") from the running object code. Since processor 102 can be optimized for high frequency processing of simple operations, in accordance with the present invention it is desirable to break these complex instructions into a plurality of simple instructions or "microinstructions" to simplify and expedite execution. In a specific implementation, the execution units are optimized to precisely handle simple or non-complex instructions with a limited number of dependencies using a limited number of resources (i.e., registers). Complex instructions include any instructions that require more than the limited number of resources or involve more than the limited number of dependencies. As will be described with reference to FIGS. 3–8, IRU 204 includes mechanisms to translate or explode complex into a plurality of microinstructions. These microinstructions are executed more efficiently in the execution units (e.g., floating-point and graphics execution unit (FGU) 210 and integer execution unit (IEU)). IRU 204 will be discussed in greater detail with reference to FIGS. 3–8.

ISU 206 receives renamed instructions from IRU 204 and registers them for execution. ISU 206 is operative to schedule and dispatch instructions as soon as their dependencies have been satisfied into an appropriate execution unit (e.g., integer execution unit (IEU) 208, or floating-point and graphics unit (FGU) 210). ISU 206 also maintains trap status of live instructions. ISU 206 may perform other functions such as maintaining the correct architectural state of processor 102, including state maintenance when out-of-order instruction processing is used. ISU 206 may include mechanisms to redirect execution appropriately when traps or interrupts occur and to ensure efficient execution of multiple threads where multiple threaded operation is used. Multiple thread operation means that processor 102 is running multiple substantially independent processes simultaneously. Multiple thread operation is consistent with but not required by the present invention.

ISU 206 also operates to retire executed instructions when completed by IEU 208 and FGU 210. ISU 206 performs the appropriate updates to architectural register files and condition code registers upon complete execution of an instruction. ISU 206 is responsive to exception conditions and discards or flushes operations being performed on instructions subsequent to an instruction generating an exception in the program order. ISU 206 quickly removes instructions from a mispredicted branch and initiates IFU 202 to fetch from the correct branch. An instruction is retired when it has finished execution and all instructions from which it depends have completed. Upon retirement the instruction's result is written into the appropriate register file and is no longer deemed a "live instruction".

IEU 208 includes one or more pipelines, each pipeline comprising one or more stages that implement integer instructions. IEU 208 also includes mechanisms for holding the results and state of speculatively executed integer instructions. IEU 208 functions to perform final decoding of integer instructions before they are executed on the execution units and to determine operand bypassing amongst instructions in an out-of-order processor. IEU 208 executes all integer instructions including determining correct virtual addresses for load/store instructions. IEU 208 also maintains correct architectural register state for a plurality of integer registers in processor 102. IEU 208 preferably includes mechanisms to access single and/or double-precision architectural registers as well as single and/or double-precision rename registers.

The floating point graphics and execution unit FGU 210 includes one or more pipelines, each comprising one or more stages that implement floating-point instructions. FGU 210 also includes mechanisms for holding the results and state of speculatively executed floating-point and graphic instructions. FGU 210 functions to perform final decoding of floating-point instructions before they are executed on the execution units and to determine operand bypassing amongst instructions in an out-of-order processor. In the specific example, FGU 210 includes one or more pipelines dedicated to implement special purpose multimedia and graphic instructions that are extensions to standard architectural instructions for a processor. FGU 210 may be equivalently substituted with a floating-point unit (FPU) in designs in which special purpose graphic and multimedia instructions are not used. FGU 210 preferably includes mechanisms to access single and/or double-precision architectural registers as well as single and/or double-precision rename registers.

A data cache memory unit (DCU) 212, including cache memory 105 shown in FIG. 1, functions to cache memory reads from off-chip memory through external interface unit (EIU) 214. Optionally, DCU 212 also caches memory write transactions. DCU 212 comprises one or more hierarchical levels of cache memory and the associated logic to control the cache memory. One or more of the cache levels within DCU 212 may be read only memory to eliminate the logic associated with cache writes.

The apparatus and method for processing complex and non-complex instructions in accordance with the present invention is implemented primarily in the instruction renaming unit IRU 204 as well as in the instruction cache of the instruction fetch unit IFU 202.

Figure 3:
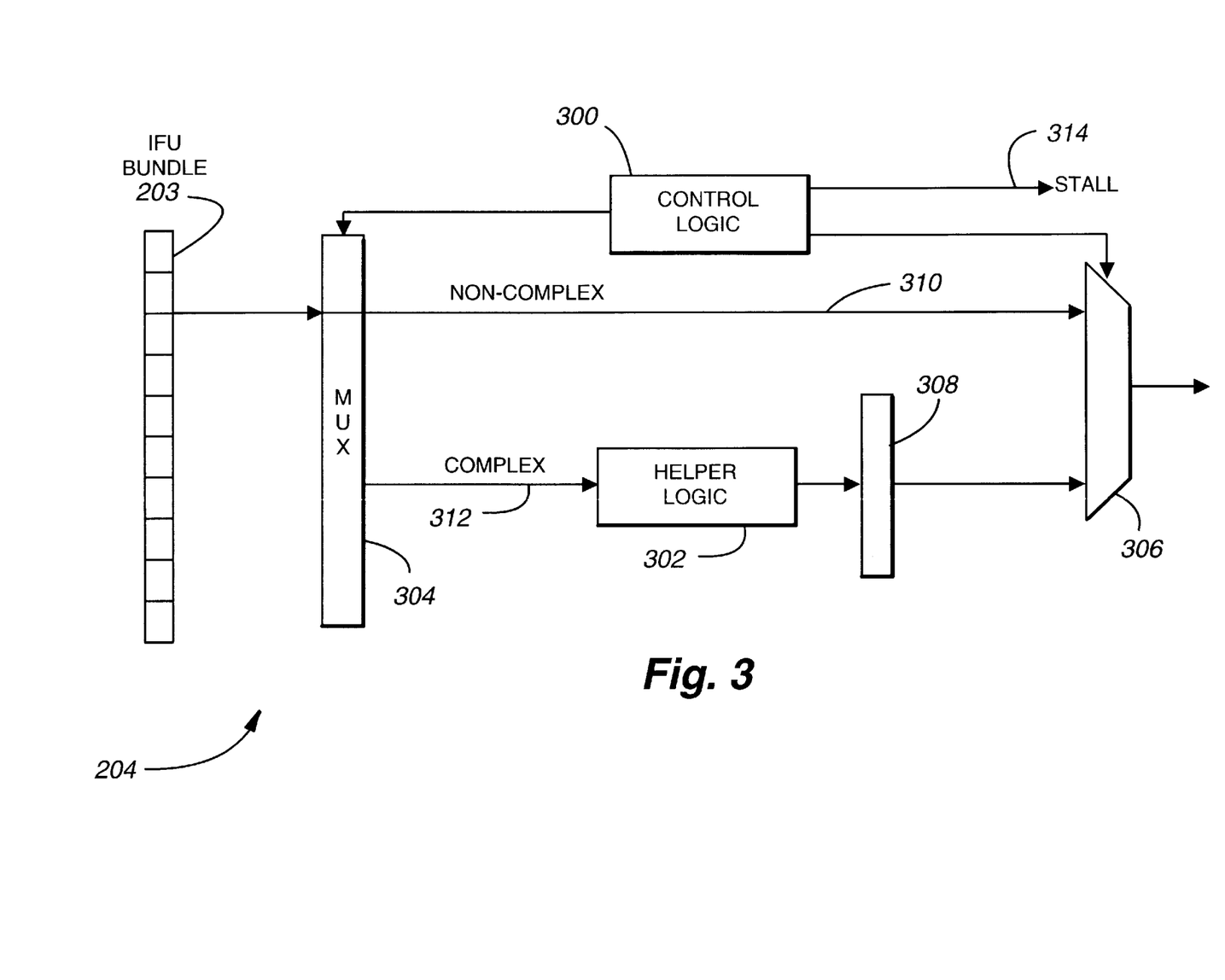
FIG. 3 shows a block diagram of the instruction renaming unit 204 having helper logic for expanding complex instructions and control logic for differentiating between non-complex and complex instructions in accordance with the present invention.

Referring to FIG. 3, a portion of the IRU 204 is shown having control logic 300 and helper logic 302. As described above, a main bundle 203 of up to eight instructions from the instruction fetch unit are passed into multiplexor 304 controlled by control logic 300. As will be further explained below, non-complex instructions are selected from the multiplexor and passed along bypass data path 310 to the output multiplexor 306. In contrast, complex instructions are selected from multiplexor 304 and passed along complex instruction path 312 for processing by the helper logic 302. Helper logic 302 expands the complex instruction into two or more simpler microinstructions and places these microinstructions into buffer 308. In this manner, only complex instructions are penalized with the microinstruction expansion operations performed by helper logic 302. While helper logic expands the complex instruction into multiple microinstruction, the control logic 300 generates a STALL signal 314 to stall the downstream pipeline until the expansion is complete. The STALL signal is used to throttle the feeding of fetch bundles from the instruction cache into the rest of the pipeline, since the pipeline will be fed microinstructions generated by helper logic 302.

Hence, non-complex instructions are optimally passed through the instruction rename unit 204 for further execution within the processor. The operations of control logic 300 will be described in greater detail in FIGS. 5, 6, 7, and 8.

Figure 4:
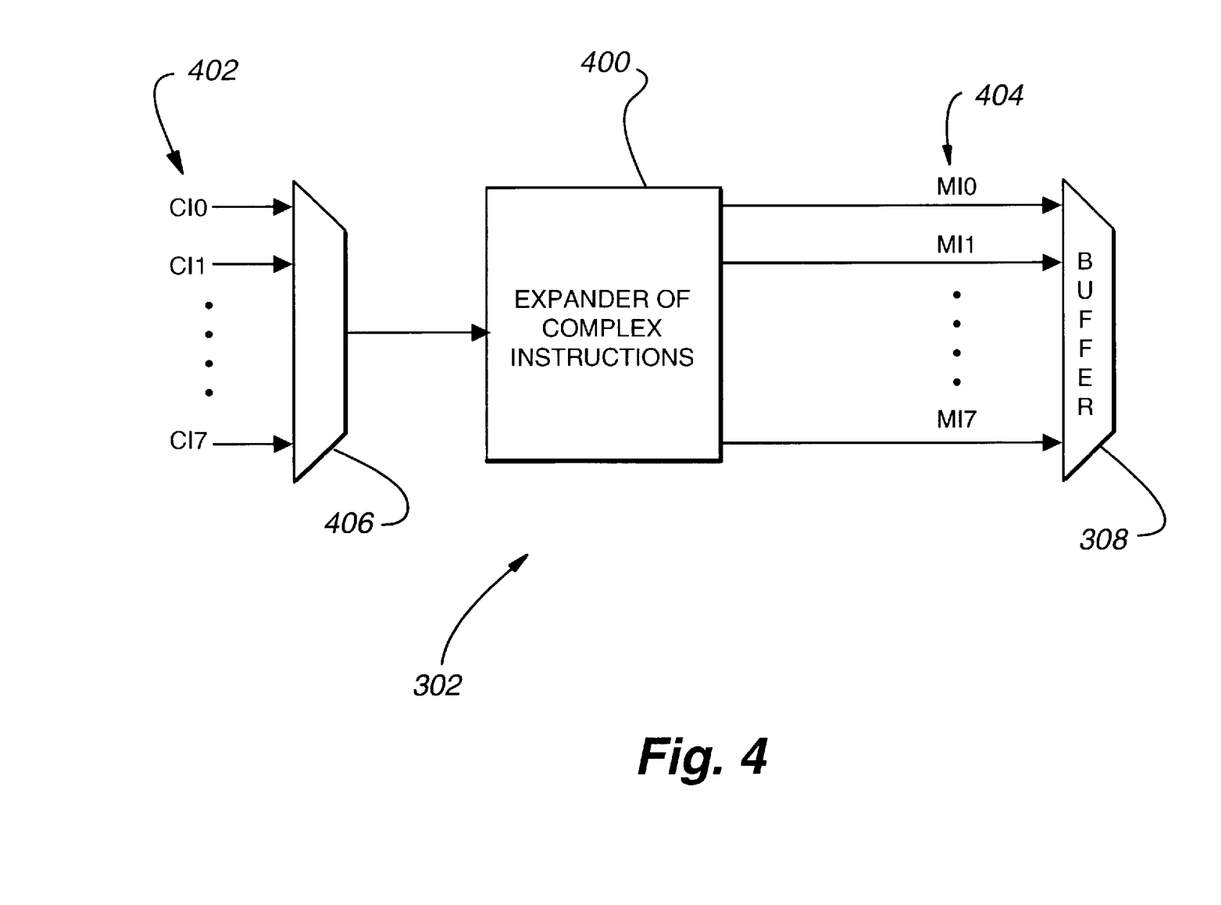
FIG. 4 shows the helper logic in block diagram in accordance with the present invention.

Referring to FIG. 4, helper logic 302 is shown. Expander 400 is responsible for expanding a complex instruction 402 into two or more corresponding microinstructions 404. Expander 400 can be implemented using programmable logic arrays or discrete logic responsive to the complex instruction's op-code for converting a particular complex instruction into an appropriate set of microinstructions. As shown in FIG. 4, one or more complex instructions 402 appear at the input of multiplexor 406. One of the complex instructions is selected and processed by expander 400 into its respective microinstructions 404. These microinstructions are then stored in buffer 308 (also shown in FIG. 3) for passage downstream within the processor.

The expansion of the complex instruction into the set of microinstructions performed by expander 400 is expected to require at least one additional clock cycle when compared to non-complex instructions which need not be expanded.

For example, the complex load-double instruction is broken up into two microinstructions. The complex instruction

| ldd | [r1], r2 |
|---|---| copies a double word from memory into an r-register pair. The word at effective memory address [r1] is copied into the even register r2. The word at the effective memory address, plus four, is copied into the following odd-numbered register r3. The upper 32 bits of both the even-numbered and odd-numbered registers are zero-filled. This is implemented using two microinstructions which load zero-extended half-words into r2 and r3:

| ldhwz | [r1], r2 |
|---|---|
| ldhwz | [r1 + 4], r3 |

Each of these microinstructions are simpler for the processor to execute than the original complex instruction. As another example, the complex instruction

| umul | r1, r2, r3 |
|---|---| performs an unsigned 32-by-32 multiply producing a 64-bit result. The 32 most significant bits of the product are written into the Y register and all 64 bits of the product are written into r3. This instruction is exploded into two microinstructions of which the first microinstruction computes and stores the 64 bit product into r3, and the second microinstruction extracts the upper 32 bits of r3 and deposits them into the Y register:

| umul | r1, r2, r3 |
| --- | --- |
| hix | r3, y |

Figure 5:
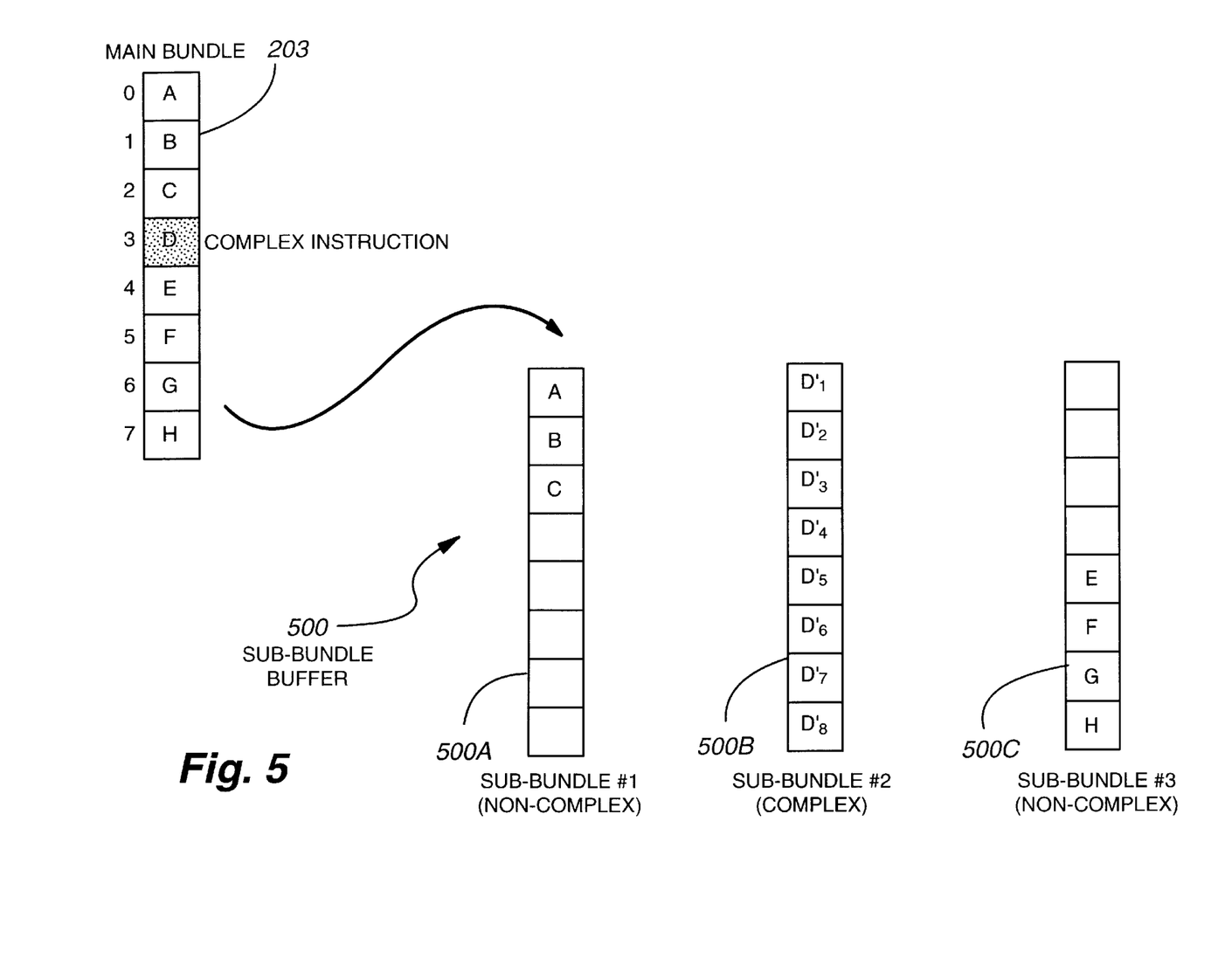
FIG. 5 illustrates the parsing of a main instruction bundle into one or more complex or non-complex sub-bundles in accordance with the present invention.

Control logic 300 is responsible for parsing an incoming main instruction bundle as well as stalling the pipeline until all expanded sub-bundles are generated. FIG. 5 illustrates how the instruction bundles are parsed to simplify the processing within IRU 204. A main bundle 203 is received from the instruction fetch unit IFU 202 (FIG. 2). As shown in FIG. 5, the main bundle can contain up to eight instructions, each instruction being either a complex instruction or a non-complex instruction. Each instruction in main bundle 203 has previously been identified by IFU 202 as being complex or non-complex. This identification can be achieved by associating a marker bit with each instruction, the marker bit representing whether the associated instruction is complex or non-complex. For instance, in the example instruction bundle shown in FIG. 5, instructions A, B, C, E, F, G, H are non-complex instructions, while instruction D is a complex instruction.

In accordance with the present invention, the main bundle of instructions is parsed by the control logic 300 into one or more sub-bundles, each sub-bundle containing either complex instructions or non-complex instructions. A buffer 500 can be used for storing the sub-bundles.

In the example of FIG. 5, there are three sub-bundles 500A, 500B, and 500C which have been generated due to the presence and location of a single complex instruction in the main instruction bundle 203. The bundles 500A, 500B, and 500C shown in FIG. 5 show the contents of the sub-bundle buffer 500 at different periods of time. The sub-bundles 500A, 500B, and 500C shown do not in fact exist simultaneously in time, but instead exist sequentially in time during different clock cycles of the processor. In brief overview, each sub-bundle can contain up to eight instructions or microinstructions, depending on the nature of the sub-bundle. Any time a complex instruction is detected, the instructions present in the sub-bundle are passed downstream for processing, and the complex instruction then is allocated the entire buffer 500. Further, instructions extracted from the main bundle are placed sequentially within the sub-bundle in the same relative position as the instructions would occupy within the main bundle 203. Maintaining the instructions in order prior to passage to the scheduling unit is needed to ensure that the proper results of the program are obtained even if the operations are executed out-of-order after scheduling.

Control logic 300 scans the main bundle 203 sequentially. Each non-complex instruction is placed in the sub-bundle buffer until a complex instruction is detected. Hence, non-complex instructions A, B, and C are placed within sub-bundle buffer 500 to form sub-bundle 500A. Because the next instruction D is a complex instruction, the sub-bundle composed of non-complex instructions A, B, and C is passed for further processing within the processor. On the next clock cycle, the helper logic 302 (FIG. 3) expands complex instruction D into its two or more microinstructions. As shown in sub-bundle 500B, complex instruction D has eight microinstructions labeled $D_1'D_2'..., D_8$ in this example. These microinstructions are then passed downstream for processing within the processor. On the next instruction cycle, control logic 300 scans the remaining instructions in the main bundle and places the non-complex instructions within the sub-bundle buffer 500. Hence, sub-bundle 500C contains non-complex instructions E, F, G, and H. These instructions are then passed downstream for processing.

Hence, it will be understood that if no complex instructions were present in the main bundle 203, each of the non-complex instructions would be placed in the sub-bundle buffer 500 and passed directly onto the downstream resources of the processor for processing. Therefore, the non-complex instructions are not penalized.

While in the example of FIG. 5 only three sub-bundles were created, it will also be understood that the apparatus and method for parsing a main instruction bundle into sub-bundles could create up to eight sub-bundles, each sub-bundle having eight microinstructions, as in the case where each of the instructions in the main bundle 203 was a complex instruction. Hence, the present invention has the capability of processing eight consecutive complex instructions contained in a single main instruction bundle.

Figure 6:
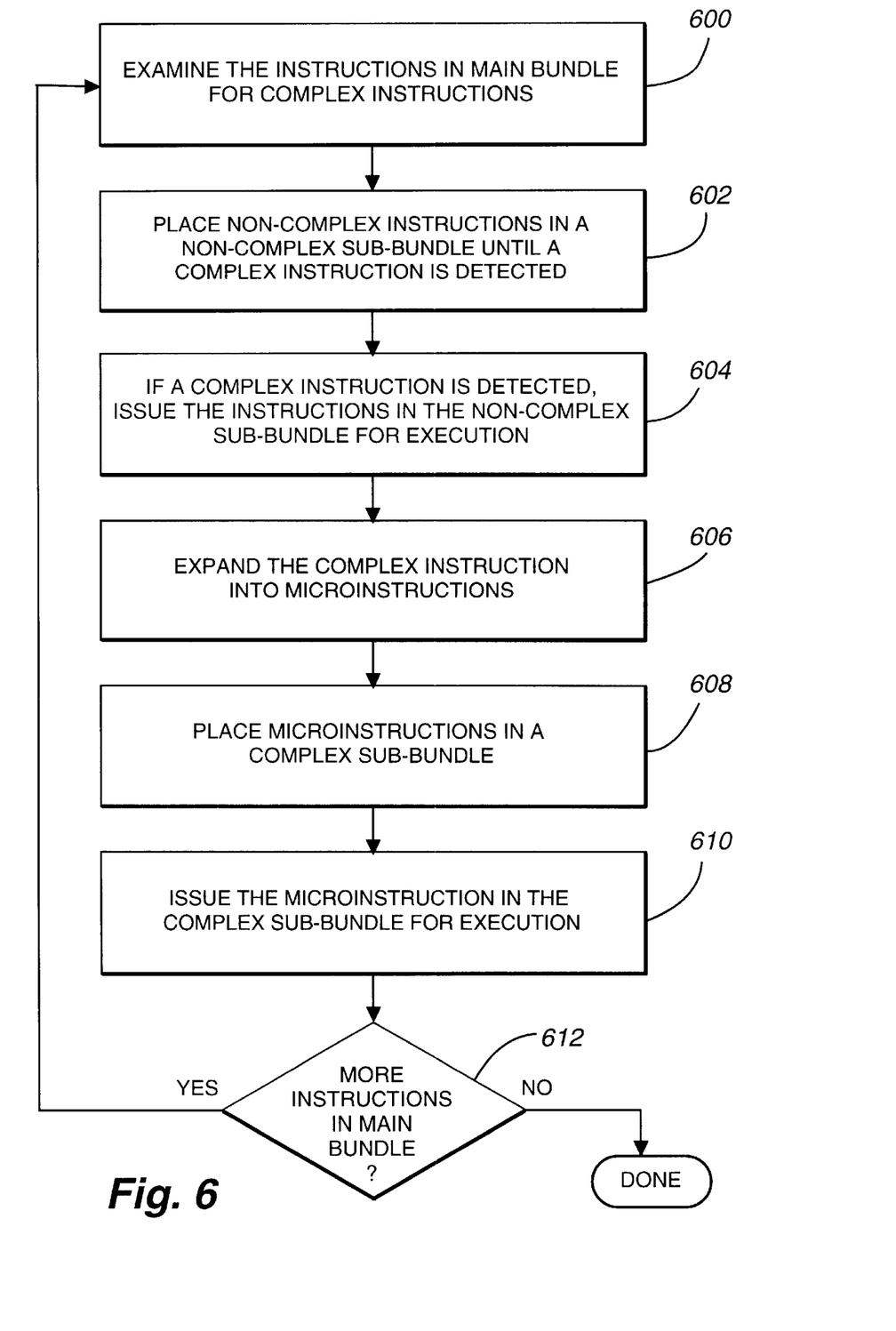
FIG. 6 shows a flow diagram of one embodiment of the present invention for parsing a main bundle into one or more complex or non-complex sub-bundles.

FIG. 6 illustrates a flow diagram of an embodiment of the operations performed by control logic 300 for parsing a main bundle of instructions into either complex sub-bundles or non-complex sub-bundles. Scanning operation 600 examines one or more instructions in the main bundle. If an instruction is not complex, operation 602 places any non-complex instructions in a non-complex sub-bundle. The non-complex sub-bundle can be placed in the sub-bundle buffer described above. Operation 602 places non-complex instructions in the sub-bundle until a complex instruction (i.e., an instruction marked as complex) is detected in the main bundle.

If a complex instruction is detected in the main bundle, issuing operation 604 issues or schedules for execution the current instructions in the sub-bundle. The sub-bundle buffer would then be available for storing new micro-instructions. The instructions are issued in the order in which they appeared in the main bundle, thereby maintaining their relative order. Expansion operation 606 then expands the complex instruction detected into multiple microinstructions. Operation 608 places the microinstructions in a complex sub-bundle which can be stored in the sub-bundle buffer. Issuing operation 610 then issues or schedules for execution the current microinstructions of the complex sub-bundle. Decision operation 612 determines if there are more instructions in the main bundle for processing so that each instruction in the main bundle is processed and scheduled for issuance.

According to the method shown in FIG. 6, a main bundle of N instructions, either simple or complex, can be parsed into the necessary number of sub-bundles for subsequent processing within the processor. Non-complex instructions are not passed through the expansion operation 606, and the relative order in which the instructions occurred in the main bundle is preserved in the sub-bundles.

While the method disclosed herein has been described and shown with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

Figure 7:
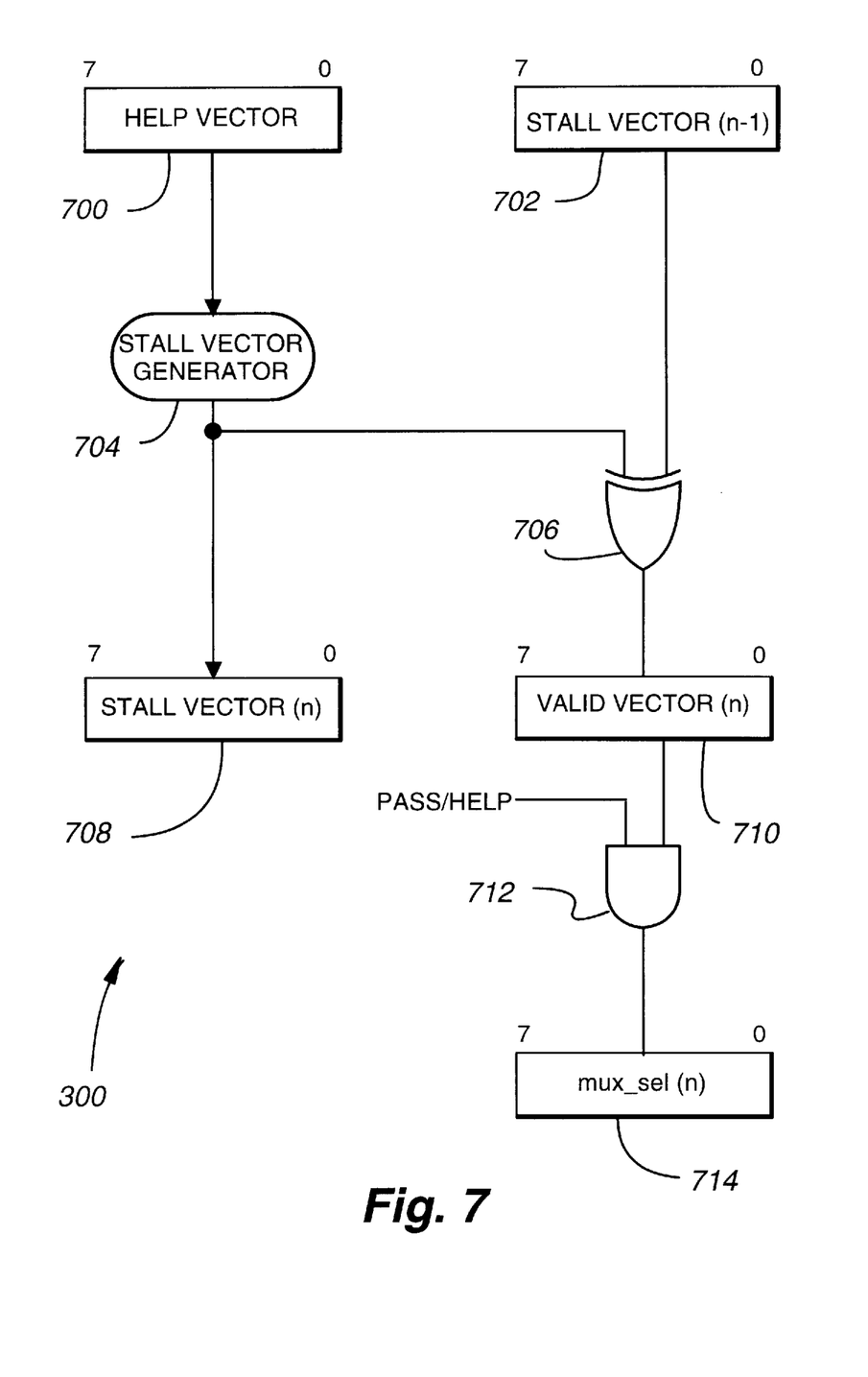
FIG. 7 shows control logic in block diagram in accordance with the present invention.
Figure 8:
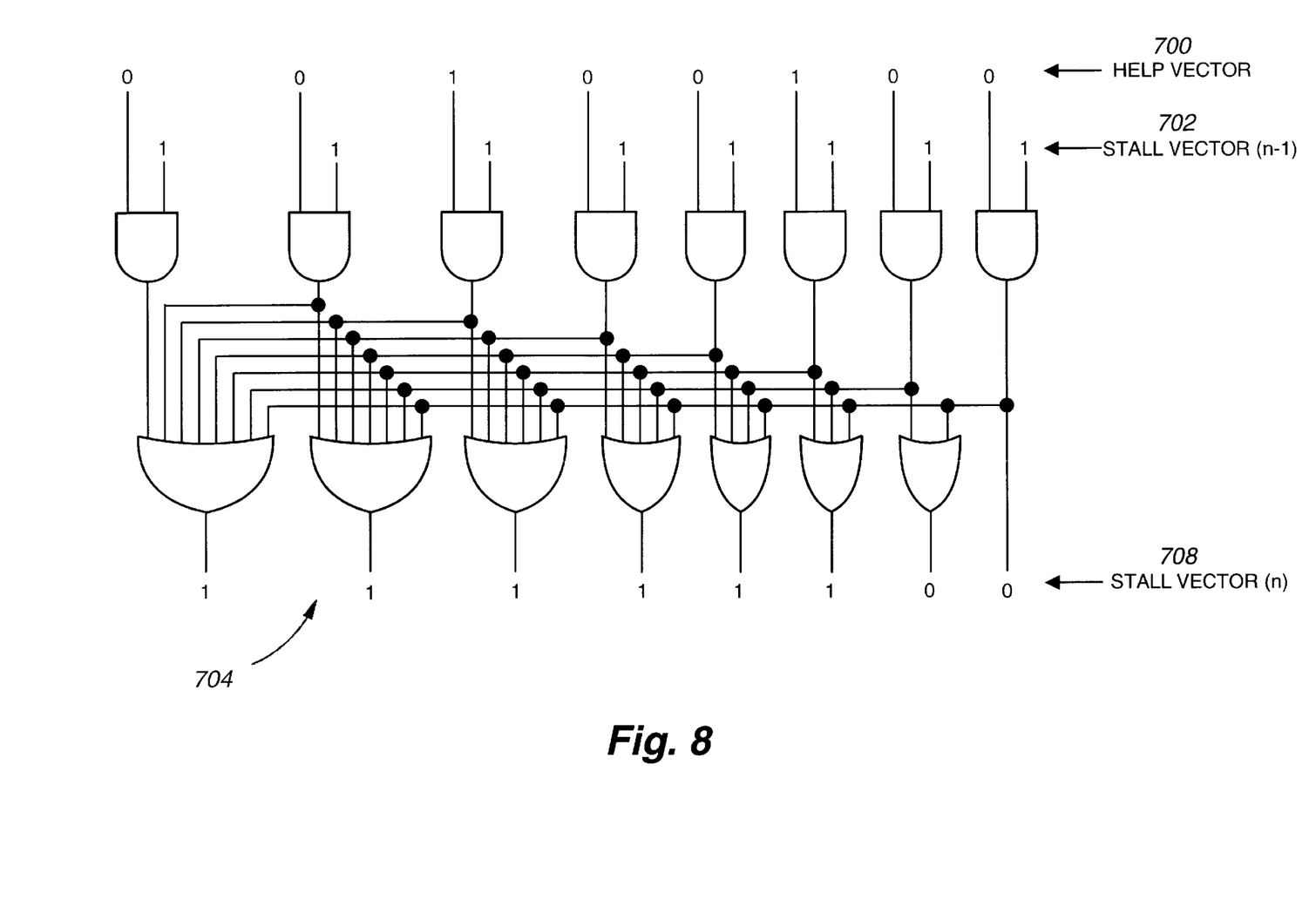
FIG. 8 shows one embodiment of the stall vector generator 704 of the control logic of FIG. 7.

With respect to the control logic 300 of the IRU 204 (FIG. 3), FIGS. 7 and 8 show an embodiment of the present invention. Complex instructions in an incoming bundle are marked by the IFU as complex using one marker bit per instruction. These bits are grouped together and form a help vector 700. The help vector 700 is used by the control logic 300 for generating an eight bit stall vector 708 to stall the pipeline if at least one of the bits in the help vector bits 700 is set, i.e., at least one instruction in the bundle is a complex instruction. Further, the control logic generates a valid vector 710 indicating valid instructions in a sub-bundle. Finally, the control logic generates a multiplexor select signal 714 ($mux_{14}$ sel) to select a complex instruction that needs to be expanded into microinstructions. Logic gate 712 (FIG. 7) uses the valid vector and a pass/help state variable, described below, to generate the mux_sel 714 signal.

The control logic alternates between two modes—a pass mode and a help/expansion mode—until all the instructions have been either passed or expanded. The pass mode passes a sub-bundle of the incoming instruction bundle, the sub-bundle containing only non-complex instructions. In the help mode, the helper logic generates microinstructions for a complex instruction.

Referring to FIGS. 7 and 8, during pass mode, stall vector 708 is calculated using the stall vector generator shown in FIG. 8. The stall vector is initialized with all bits set to one. There is a stall vector corresponding to each sub-bundle of instructions. The valid vector 710 is the stall vector XOR'd with the stall vector 702. The valid bits of the incoming instructions are then ANDed with the valid vector 710 to generate the pass signal for passing a non-complex instruction downstream. In the pass mode, the mux_sel signal 714 is a DON'T CARE.

During help mode, the stall vector 708 equals the stall vector 702 shifted by one digit to the left. The valid vector is a DON'T CARE in this mode. The microinstructions generated by the helper logic are marked by the helper logic as valid before they are placed in the output multiplexor 306. These valid bits can be used by structures further down the pipeline to process the microinstructions and distinguish between when a complex instruction, foe example, produces two microinstructions or eight microinstructions. In the help mode, the $mux_{14}$ sel 714 value equals the stall vector 708 XORed with the stall vector 702 (i.e., equal to the valid vector 710). As explained above, the STALL signal is used to throttle the feeding of fetch bundles from the instruction cache into the rest of the pipeline, since the pipeline will be fed microinstructions generated by helper logic 302.

Using this logic, the control logic 300 can be implemented as a state machine (not shown) having a pass state and a help state. The pass state is entered upon receiving a valid bundle, and then the control logic alternates between the pass state and the help state. The control logic scans the stall vector 708 to determine when to go back to the pass state and de-assert the stall signal.

Figure 9:
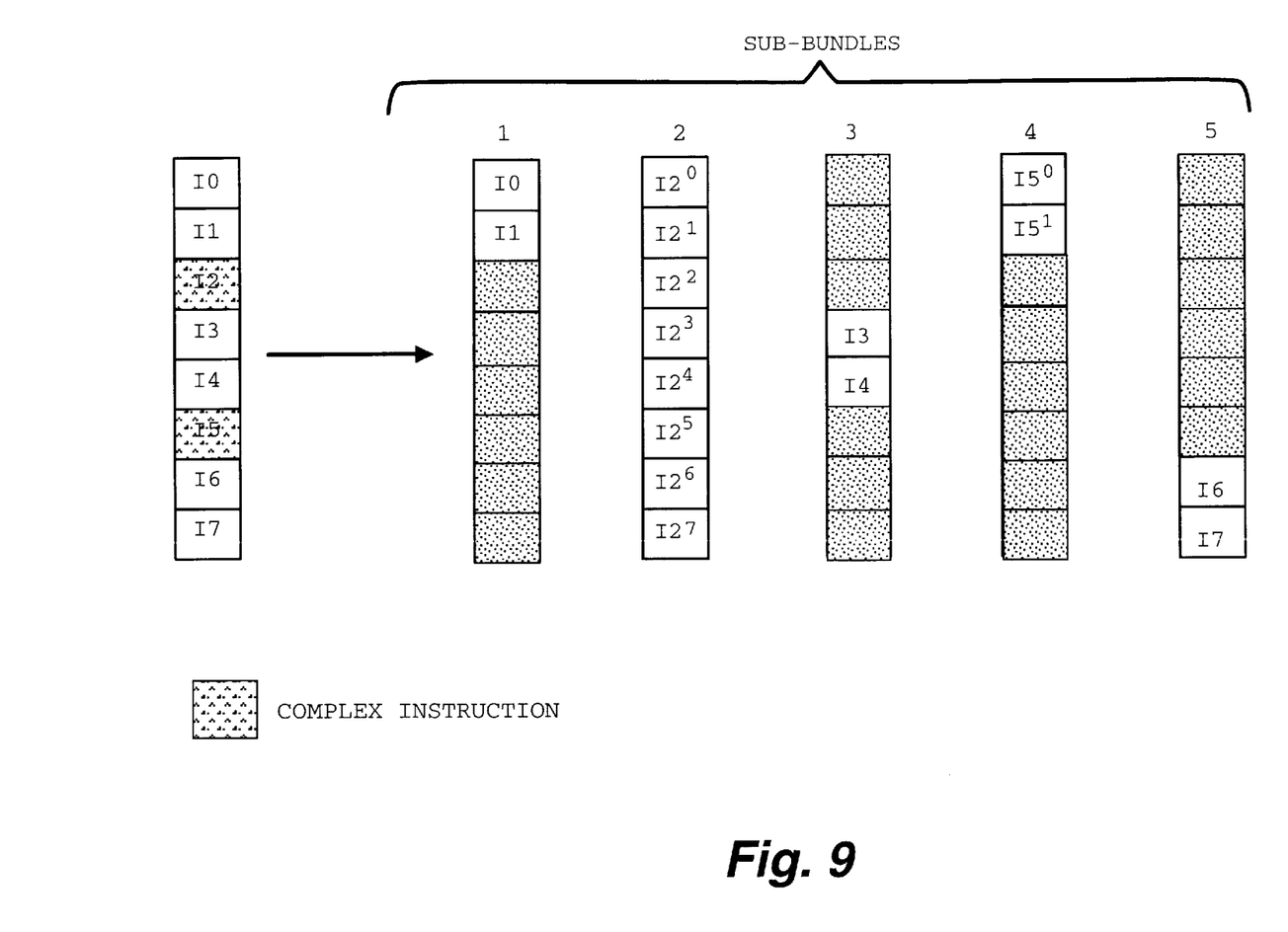
FIG. 9 shows an example of a main bundle of instructions broken into five sub-bundles of instructions.

The following example illustrates the operation of the embodiment shown in FIGS. 7 and 8. In this example, it is assumed that an eight instruction main bundle contains two complex instructions at the third and sixth positions in the main bundle. Correspondingly, there are five sub-bundles. FIG. 9 shows the content of each sub-bundle for this example.

Because there are five sub-bundles, processing the sub-bundles may require five instruction cycles. The values of the vectors and variables shown in FIGS. 7 and 8 over the five clock cycles are as follows:

| CLK#1 | Help Vector    | 0 0 1 0 0 1 0 0 | PASS         |
|-------|----------------|-----------------|--------------|
|       | Stall Vector #0 | 1 1 1 1 1 1 1 1 | (don't care) |
|       | Stall Vector #1 | 1 1 1 1 1 1 0 0 |              |
|       | Valid Vector #1 | 0 0 0 0 0 0 1 1 |              |
|       | mux_sel #1      | 0 0 0 0 0 0 0 0 |              |
| CLK#2 | Help Vector    | 0 0 1 0 0 1 0 0 | HELP         |
|       | Stall Vector #1 | 1 1 1 1 1 1 0 0 | (don't care) |
|       | Stall Vector #2 | 1 1 1 1 1 0 0 0 |              |
|       | Valid Vector #2 | 0 0 0 0 0 1 0 0 |              |
|       | mux_sel #2      | 0 0 0 0 0 1 0 0 |              |
| CLK#3 | Help Vector    | 0 0 1 0 0 1 0 0 | PASS         |
|       | Stall Vector #2 | 1 1 1 1 1 0 0 0 | (don't care) |
|       | Stall Vector #3 | 1 1 1 0 0 0 0 0 |              |
|       | Valid Vector #3 | 0 0 0 1 1 0 0 0 |              |
|       | mux_sel #3      | 0 0 0 0 0 0 0 0 |              |
| CLK#4 | Help Vector    | 0 0 1 0 0 1 0 0 | HELP         |

| | Stall Vector #3 | 1 1 1 0 0 0 0 0 | (don't care) |
|-|-----------------|-----------------|--------------|
| | Stall Vector #4 | 1 1 0 0 0 0 0 0 |              |
| | Valid Vector #4 | 0 0 1 0 0 0 0 0 |              |
| | mux_sel #4      | 0 0 1 0 0 0 0 0 |              |
| CLK#5 | Help Vector | 0 0 1 0 0 1 0 0 | PASS |
| | Stall Vector #4 | 1 1 0 0 0 0 0 0 | (don't care) |
| | Stall Vector #5 | 0 0 0 0 0 0 0 0 |              |
| | Valid Vector #5 | 1 1 0 0 0 0 0 0 |              |
| | mux_sel #5      | 0 0 0 0 0 0 0 0 |              |

While the invention has been particularly shown and described with reference to a preferred embodiment thereof, it will be understood by those skills in the art that various other changes in the form and details may be made without departing from the spirit and scope of the invention. For instance, while the present invention has been described with reference to a processor architecture shown in FIG. 2, it will be understood that the present invention could be used in other equivalent processor designs.

What is claimed is:

1. In a processor that executes coded instructions in one or more pipelines, a method for processing a set of instructions comprising one or more complex instructions and one or more non-complex instructions, the method comprising the steps of:

grouping said instructions into a bundle of instructions;

analyzing an instruction in the bundle to detect a complex instruction;

placing non-complex instructions into a first sub-bundle until a complex instruction is detected;

upon detecting a complex instruction, issuing said first sub-bundle for execution;

expanding said complex instruction into two or more microinstructions in a second sub-bundle;

issuing said second sub-bundle for execution; and repeating said analyzing step on each instruction in the bundle.

2. The method of claim 1, wherein said grouping step further comprises:

fetching the bundle of instructions from a cache containing instructions for execution;

determining which instructions in the bundle are complex instructions; and marking said complex instructions with a marker bit indicating said instruction is complex.

3. The method of claim 2, wherein said determining step accesses a table containing a list identifying the complex instructions supported by the processor.

4. The method of claim 2, wherein said analyzing step further comprises examining the marker bit of each instruction in the bundle.

5. The method of claim 1, further comprising:

providing a sub-bundle buffer for storing said first sub-bundle.

6. The method of claim 5, wherein said issuing said first sub-bundle step further comprises clearing said sub-bundle buffer.

7. The method of claim 5, wherein said expanding step places said two or more microinstructions in said sub-bundle buffer.

* * * * *